US010403422B2

(12) United States Patent
Biermann et al.

(10) Patent No.: US 10,403,422 B2
(45) Date of Patent: Sep. 3, 2019

(54) MAGNETO RHEOLOGICAL FLUID COMPOSITION FOR USE IN VEHICLE MOUNT APPLICATIONS

(71) Applicant: BeijingWest Industries Co., Ltd., Beijing (CN)

(72) Inventors: Julie Mary Biermann, Moraine, OH (US); Elena Vasiliu, Moraine, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 40 days.

(21) Appl. No.: 15/309,909

(22) PCT Filed: Mar. 4, 2015

(86) PCT No.: PCT/CN2015/073645
§ 371 (c)(1),
(2) Date: Nov. 9, 2016

(87) PCT Pub. No.: WO2016/011812
PCT Pub. Date: Jan. 28, 2016

(65) Prior Publication Data
US 2017/0271064 A1 Sep. 21, 2017

Related U.S. Application Data

(60) Provisional application No. 62/027,269, filed on Jul. 22, 2014.

(51) Int. Cl.
*H01F 1/44* (2006.01)
*F16F 9/32* (2006.01)
*F16F 9/53* (2006.01)

(52) U.S. Cl.
CPC ............ *H01F 1/447* (2013.01); *F16F 9/3207* (2013.01); *F16F 9/535* (2013.01); *F16F 2224/02* (2013.01); *F16F 2224/045* (2013.01)

(58) Field of Classification Search
CPC ......... H01F 1/447; F16F 9/3207; F16F 9/535; F16F 2224/045; F16F 2224/02
See application file for complete search history.

(56) References Cited

U.S. PATENT DOCUMENTS 4,992,190 A    2/1991  Shtarkman
5,578,238 A *  11/1996  Weiss ...................... H01F 1/447
                                              252/62.51 R
(Continued)

FOREIGN PATENT DOCUMENTS

CN        1414075       4/2003
CN        103897789 A   7/2014
(Continued)

OTHER PUBLICATIONS

First Office Action and Search Report dated Jan. 12, 2018, for counterpart Chinese Patent Appplication No. 201580038641.9 (11 Pages).

(Continued)

*Primary Examiner* — Peter F Godenschwager
*Assistant Examiner* — Andrew J. Oyer
(74) *Attorney, Agent, or Firm* — William H. Honaker; Dickinson Wright PLLC (57) ABSTRACT

The present invention provides a magneto rheological fluid composition for use in a vehicle mount having a flexible body and a diaphragm. The magneto rheological fluid composition consists of a carrier fluid, a plurality of magnetic responsive particles dispersed in the carrier fluid and an anti-settling agent of fumed silica dispersed in the carrier fluid forming a thixotropic network with the carrier fluid suspending the magnetic responsive particles in the thixotropic network for preventing the magnetic responsive particles from settling. The magneto rheological fluid composition of the present invention contains no additional additives providing stability to the thixotropic network and (Continued)

to the magneto rheological fluid and preventing the flexible body and the diaphragm from reacting with the composition to prolong the life of the composition.

7 Claims, 7 Drawing Sheets

(56) References Cited

U.S. PATENT DOCUMENTS

| | | | |
|---|---|---|---|
| 6,132,633 | A | 10/2000 | Carlson |
| 7,070,708 | B2 | 7/2006 | Iyengar et al. |
| 2001/0045540 | A1 | 11/2001 | Iyengar |
| 2003/0042461 | A1 | 3/2003 | Ulicny et al. |
| 2003/0102455 | A1 | 6/2003 | Foister et al. |
| 2005/0242321 | A1* | 11/2005 | Iyengar ............ F16F 13/305 252/62.52 |
| 2005/0242621 | A1 | 11/2005 | Buchholz et al. |
| 2016/0216187 | A1* | 7/2016 | Gao .................. E21B 49/08 |

FOREIGN PATENT DOCUMENTS

| | | |
|---|---|---|
| EP | 1283530 A2 | 2/2003 |
| EP | 2015319 | 1/2009 |
| JP | 9512137 | 12/1997 |
| JP | 2005180611 A | 7/2005 |
| JP | 2014095031 A | 5/2014 |
| WO | 95/28719 | 10/1995 |

OTHER PUBLICATIONS

Extended Search Report dated Feb. 12, 2018, for counterpart European Patent Application No. 1582483.6.
The effect of SiO2 particle size on the performance of magnetorheological fluids, Yagn jianjian et al. Functional Materials, vol. 4, Feb. 17, 2014 (4 Pages).
First Office Action issued for corresponding Japanese Patent Application 2016-575749 dated Jan. 9, 2018.
International Search Report, dated Jun. 3, 2015; two (2) pages.
Second Office Action and search report dated Dec. 5, 2018 for counterpart Chinese patent application No. 201580038641.9.
Second Office Action issued for corresponding Japanese Patent Application 2016-575749 dated Aug. 28, 2018.

* cited by examiner

Prior Art

MAGNETO RHEOLOGICAL FLUID COMPOSITION FOR USE IN VEHICLE MOUNT APPLICATIONS

CROSS REFERENCE TO RELATED APPLICATION

This application claims the benefit of PCT International Application Serial No. PCT/CN2015/073645 filed on Mar. 4, 2015, which claims benefit of U.S. Provisional Patent Application 62/027,269 filed on Jul. 22, 2014, and entitled "Magneto Rheological Fluid Composition for use in Vehicle Mount Applications."

BACKGROUND OF THE INVENTION

1. Field of the Invention

The present invention relates to a Magneto Rheological Fluid Composition.

2. Description of the Prior Art

A magneto rheological fluid is a type of smart fluid. When subjected to a magnetic field, the magneto rheological fluid greatly increases its viscosity. Importantly, the yield stress of the magneto rheological fluid when in its active state can be controlled very accurately by varying the strength of the magnetic field. Application of the magneto rheological fluids is vast, and it expands with each advance in the dynamics of the fluid. Magneto rheological fluids are commonly used in vehicle mounts and suspension assemblies. One such application is the use of the magneto rheological fluid composition in a vehicle mount having a flexible body and a diaphragm. Such magneto rheological fluid composition is disclosed in U.S. Pat. No. 7,070,708. The magneto rheological fluid composition includes a carrier fluid, a plurality of magnetic responsive particles dispersed in the carrier fluid and an anti-settling agent of fumed silica dispersed in the carrier fluid. The anti-settling agent forms a thixotropic network with the carrier network suspending the magnetic responsive particles in the thixotropic network for preventing the magnetic responsive particles from settling. The thixotropic network is defined as a suspension of the magnetic responsive particles that at low shear rates form a loose network or structure, sometimes referred to as a cluster or a flocculate. The presence of this structure imparts a small degree of rigidity to the magneto rheological fluid composition thereby reducing particle settling. However, when a shearing force is applied through mild agitation the thixotropic network can be easily disrupted or dispersed. When the shearing force is removed the thixotropic network can be reformed.

The U.S. Pat. No. 7,070,708 further discloses that the magneto rheological fluid composition include additives such as ethoxylated amines and propylene glycol for providing stability to the magneto rheological fluid. However, studies have shown that ethoxylated animes, propylene glycol and other additives in the magneto rheological fluid composition reacts with the flexible body and the diaphragm of the vehicle mount. The reaction generates gases in the vehicle mount which causes pressure buildup in the vehicle mount thereby inhibiting the full functional performance of the vehicle. In addition, the reaction also forms dimers and trimers in the magneto rheological fluid composition disrupting the thixotropic network formed in the magneto rheological fluid composition and causing the magnetic responsive particles to settle out of the magneto rheological fluid composition reducing the life of the magneto rheological fluid composition. Accordingly, the magneto rheological fluid will no longer respond to the magnetic field thereby causing vehicle mount failures.

SUMMARY OF THE INVENTION

The present invention provides for a magneto rheological fluid composition being absent of any additional additives to provide stability to the thixotropic network of the composition. In addition, the present invention also prevents the flexible body and the diaphragm from reacting with the composition to prolong the life of the composition.

Advantages of the Invention

The invention in its broadest aspect provides for a magneto rheological fluid composition having a longer fluid life thereby providing an improvement on the full functional performance of the vehicle mount.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

One aspect of the present invention includes a magneto rheological fluid composition for use in a vehicle mount having a flexible body and a diaphragm. The magneto rheological fluid composition consists of a carrier fluid, a plurality of magnetic responsive particles dispersed in the carrier fluid and an anti-settling agent of fumed silica dispersed in the carrier fluid forming a thixotropic network with the carrier fluid suspending the magnetic responsive particles in the thixotropic network for preventing the magnetic responsive particles from settling. The magneto rheological fluid composition of the present invention contains only the carrier fluid, the plurality of magnetic responsive particles and the anti-settling agent. In other words, the magneto rheological fluid composition of the present invention contains no additional additives providing stability to the thixotropic network and to the magneto rheological fluid and preventing the flexible body and the diaphragm from reacting with the composition to prolong the life of the composition.

The carrier fluid of the magneto rheological fluid composition forms a continuous phase in the magneto rheological fluid and present in an amount of between 10 wt. % and 73 wt. %, preferably present in an amount of between 23 wt. % and 38 wt. % and most preferably present in amount of 26 wt. % to 36 wt. %. The carrier fluid can be of any organic fluid, preferably a non-polar organic fluid. Examples of suitable fluids include but not limited to silicone oils, mineral oils, paraffin oils, silicone copolymers, white oils and hydraulic oils. In addition, a mixture of the suitable fluids may be used as the carrier fluid for the present invention. For the magneto rheological fluid composition of the present invention, silicone oil is particularly preferred as the carrier fluid and present in an amount of between 30 wt. % and 32 wt. %.

The plurality of magnetic responsive particles of the magneto rheological fluid composition is dispersed in the carrier fluid and present in amount of between 25 wt. % and 80 wt. %, preferably 60 wt. % and 70 wt. % and most preferably 64 wt. % and 68 wt. %. The magnetic responsive particles can be of any solid made from paramagnetic, superparamagnetic and ferromagnetic elements and compounds. Examples of suitable magnetic responsive particles include iron, iron alloys, iron oxides (including $Fe_2O_3$ and $Fe_3O_4$), iron oxide powder/iron powder mixtures and iron oxide powder/reduced iron powder mixtures. For the magneto rheological fluid composition of the present invention, iron is particularly preferred as the magnetic responsive particles and present in an amount of between 64 wt. % and 65 wt. %. The magnetic responsive particles are typically in the form of a metallic powder. Particle size of the magnetic responsive particles should be selected so that the magnetic responsive particles can align themselves in the carrier fluid in response to a magnetic field. Average particle diameter sizes for the magnetic-responsive particles are generally between 1 and 1000 μm.

The anti-settling agent of fumed silica is also dispersed in the carrier fluid and present in an amount of between 2 wt. % and 10 wt. %, preferably 2 wt. % and 7 wt. % and most preferably between 2 wt. % and 6 wt. %. The fumed silica forms a thixotropic network to suspend the magnetic responsive particles in the thixotropic network for preventing the magnetic responsive particles from settling out of the thixotropic network. The anti-settling agent suspends the magnetic responsive particles in the thixotropic network by the intermolecular force of Hydrogen bonding. The thixotropic network of the present invention effectively prevents the settling of the magnetic responsive particles in the magneto rheological material composition. Examples of suitable anti-settling agents include metal oxide powders such as precipitated silica gel, fumed or pyrogenic silica, silica gel or a combination of at least one of the foregoing metal oxide powders. For the magneto rheological fluid composition of the present invention, fumed silica is particularly preferred as the anti-settling agent and present in an amount of between 3 wt. % and 5 wt. %.

The magneto rheological fluid composition of the present invention has a density ranging between 2.2 g/ml and 2.5 g/ml and a viscosity ranging between 200 cP and 400 cP at a temperature of 40° C. In the presences of a magnetic field having a magnetic strength of 0.1 T, the magneto rheological fluid composition has a magnetic yield stress between 0.1-4 kPa. In the presence of a magnetic field having a magnetic field strength of 0.5 T, the magnetic fluid composition has a magnetic yield stress between 18-24 kPa. In the presence of a magnetic field having a magnetic field strength of 0.9 T, the magneto rheological fluid composition has a magnetic yield stress of between 26-40 kPa.

Figure 1:
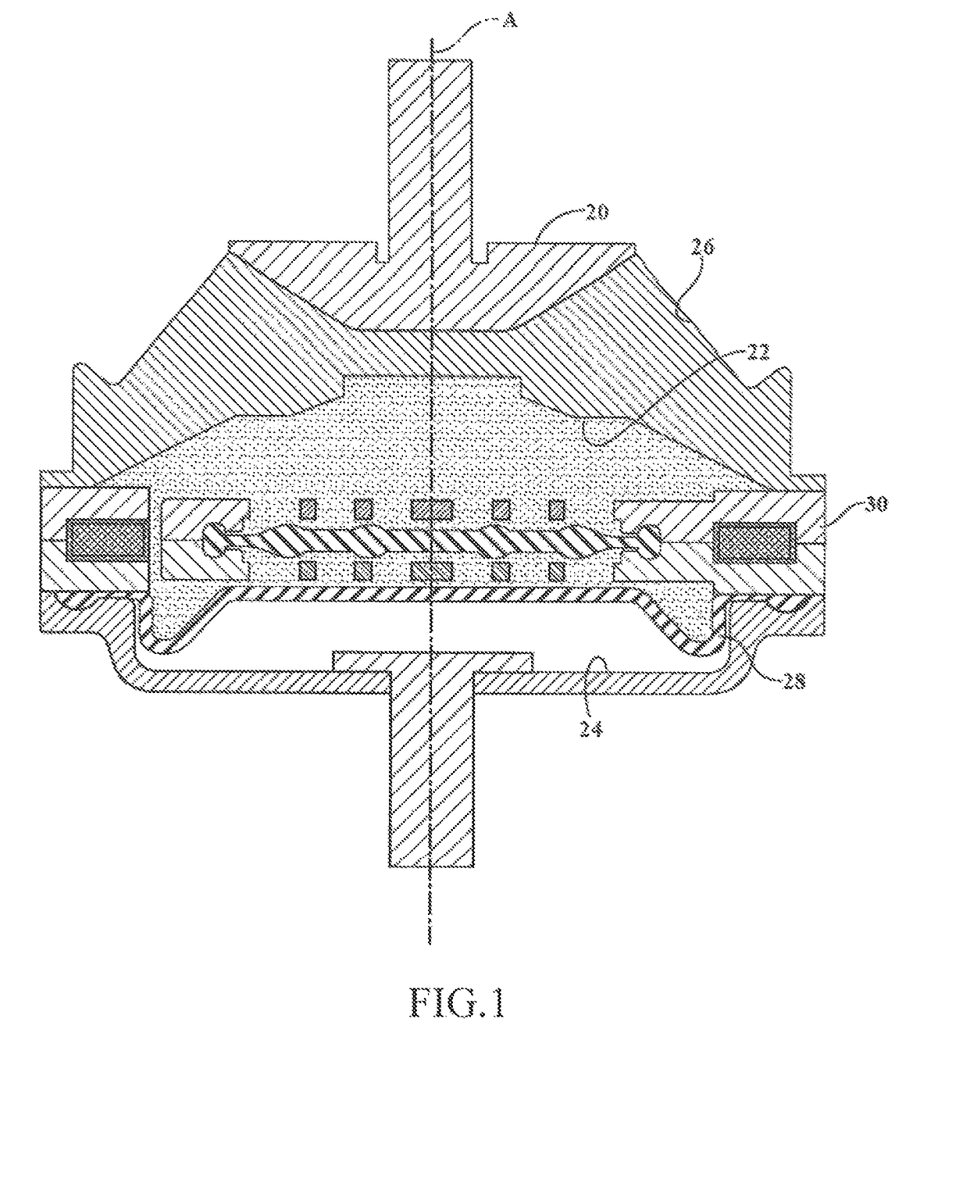
FIG. 1 is a schematic cross-sectional view of a vehicle mount which the magneto rheological fluid composition of the present invention may be utilized.

Another aspect of the present invention includes a vehicle mount apparatus for supporting a vibration source. The apparatus, as generally shown in FIG. 1, includes a housing 20 extending about and along a first axis A and defining a housing chamber 22, 24. A flexible body 26 made of elastic material and at least partially disposed in the housing chamber 22, 24 supported by the housing 20. The flexible body 26 extends radially about and along the first axis A for deforming elastically in response to a movement of the vibration source relative to the housing 20 caused by an external excitation. A diaphragm 28 made of an elastic material is disposed in the housing chamber 22, 24 and spaced axially from the flexible body 26. A partition assembly 30, as generally indicated, is disposed in the housing chamber 22, 24 extending between the flexible body 26 and the diaphragm 28 for dividing the housing chamber 22, 24 into an upper chamber 22 and a lower chamber 24. The upper chamber 22 extends between the flexible body 26 and the partition assembly 30. The lower chamber 24 extends between the partition assembly 30 and the diaphragm 28. The volume of the upper chamber 22 and the lower chamber 24 can be changed by deformation of the flexible body 26 and the diaphragm 28 in response to the external excitation. The partition assembly 30 defines a passage extending parallel to the first axis A and is disposed in fluid communication with the upper chamber 22 and the lower chamber 24 for allowing a fluid to flow between the upper chamber 22 and the lower chamber 24.

A magneto rheological fluid being responsive to a magnetic field is disposed in the upper chamber 22 and in the lower chamber 24. The magneto rheological fluid consist of a carrier fluid of silicone oil present in an amount of 30 wt. % to 32 wt. %. The magneto rheological fluid includes a magnetic responsive particle of iron present in an amount of 64 wt. % to 66 wt. % dispersed in the carrier fluid. The magneto rheological fluid further includes an anti-settling agent of fumed silica dispersed in the carrier fluid forming a thixotropic network with the carrier network suspending the magnetic responsive particles in the thixotropic network for preventing the magnetic responsive particles from settling. The fumed silica is present in an amount of 3 wt. % to 5 wt. %. The magneto rheological fluid is absent of any additional additives providing stability to the thixotropic network preventing the magneto rheological fluid from reacting with the diaphragm 28 and the flexible body 26 to prolong the life of the magneto rheological fluid.

Example 1

To demonstrate the differences between the magneto rheological fluid composition of the present invention and the current magneto rheological fluid used in the industry (Prior Art), various tests are conducted and the properties of the magneto rheological fluids are measured and compared. The magneto rheological fluid composition of the present invention used during the tests consists of silicone oil, a plurality of magneto responsive particles of iron and fumed silica. The Prior Art includes silicone oil, silica clay, a plurality of magneto responsive particles of iron, ethoxylated amine (e.g. Ethomeen® T-15) and propylene glycol.

Figure 2:
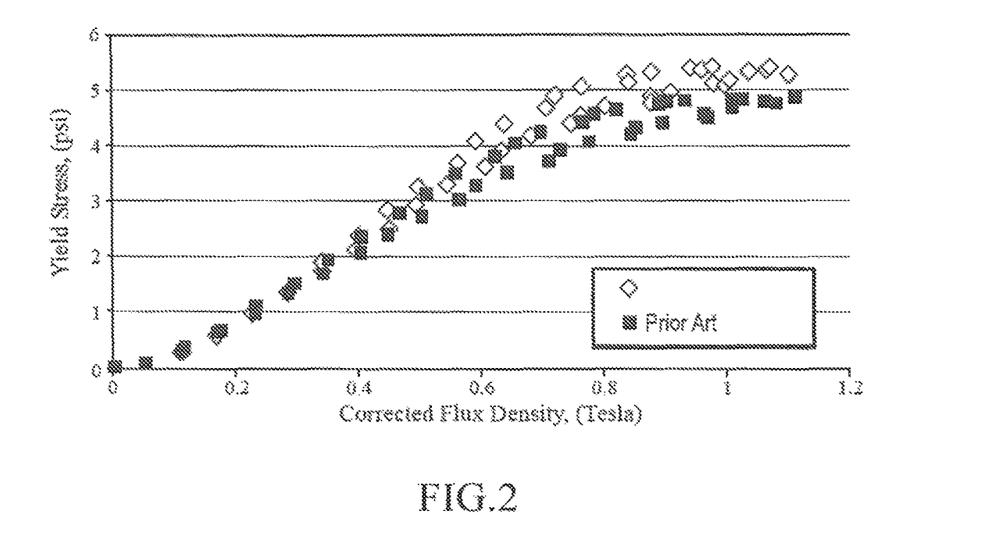
FIG. 2 is a plot comparing the yield stress for the magneto rheological fluid composition of the present invention and the current magneto rheological fluid composition used in the industry (Prior Art) under a magnetic field having a magnetic strength between 0 T and 1.2 T.

Yield stress for the magneto rheological fluid composition of the present invention and the Prior Art are measured and compared. The yield stress is measured by subjecting both magneto rheological fluids under magnetic fields having a magnetic strength ranging between 0 T and 1.1 T. FIG. 2 shows a comparison of the yield stress for the magneto rheological fluid composition of the present invention and the Prior Art. As shown in FIG. 2, the magneto rheological fluid composition of the present invention has a higher yield stress than the Prior Art under the magnetic fields having the magnetic strength of between 0.5 T and 1.1 T.

Figure 3:
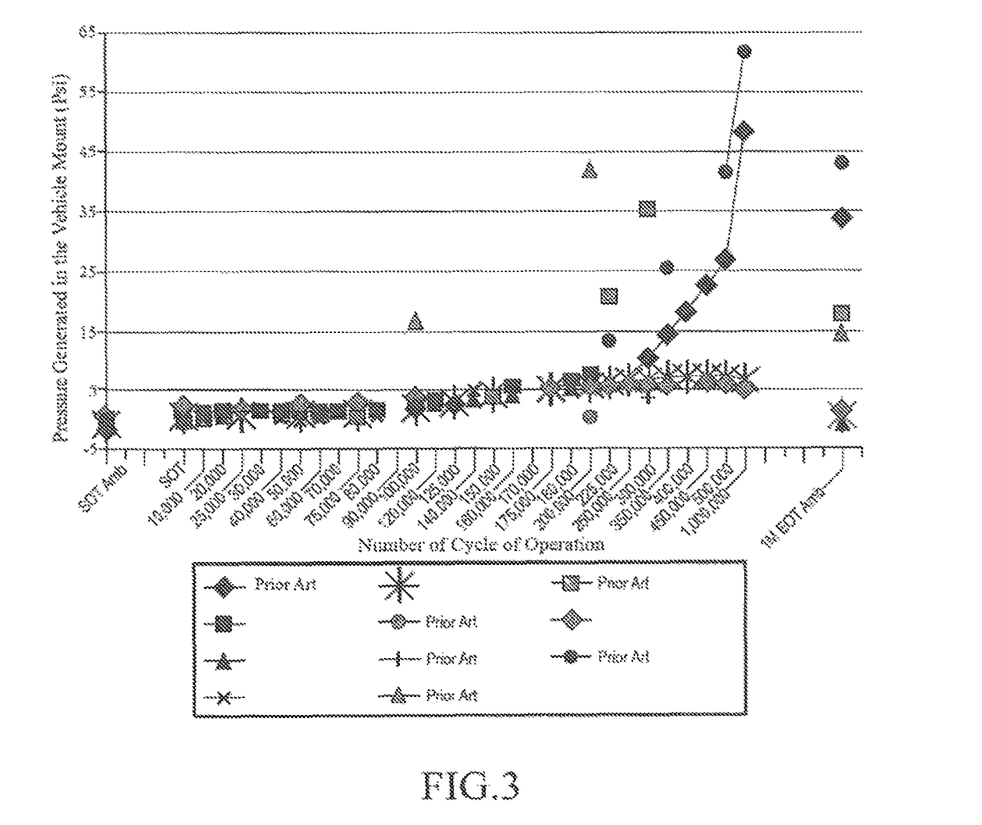
FIG. 3 is a plot comparing the pressure generation in the vehicle mount using the magneto rheological fluid composition of the present invention and the Prior Art over 1,000,000 cycles of operation.

Durability tests for the magneto rheological fluid composition of the present invention and the Prior Art are also performed. A vehicle mount having a similar structure as shown in FIG. 1 is used for the durability tests. The vehicle mount is operated at a frequency of 10 Hz and actuated at a compression/rebound distance of between ±2 mm is used for the durability test. A 4A cyclic current is applied to the vehicle mount for generating a magnetic field. A total of 1,000,000 cycles of operation of the vehicle mount is performed. The pressure generation in the vehicle is measured throughout the 1,000,000 cycles of operation. FIG. 3 shows a comparison of the pressure generation in the vehicle mount caused by the magneto rheological fluid composition of the present invention and the Prior Art. As indicated by FIG. 3, near the end of the 1,000,000 cycles of operation, the pressure generated in the vehicle mount is lower when the magneto rheological fluid composition of the present invention is used than the Prior Art.

Figure 4:
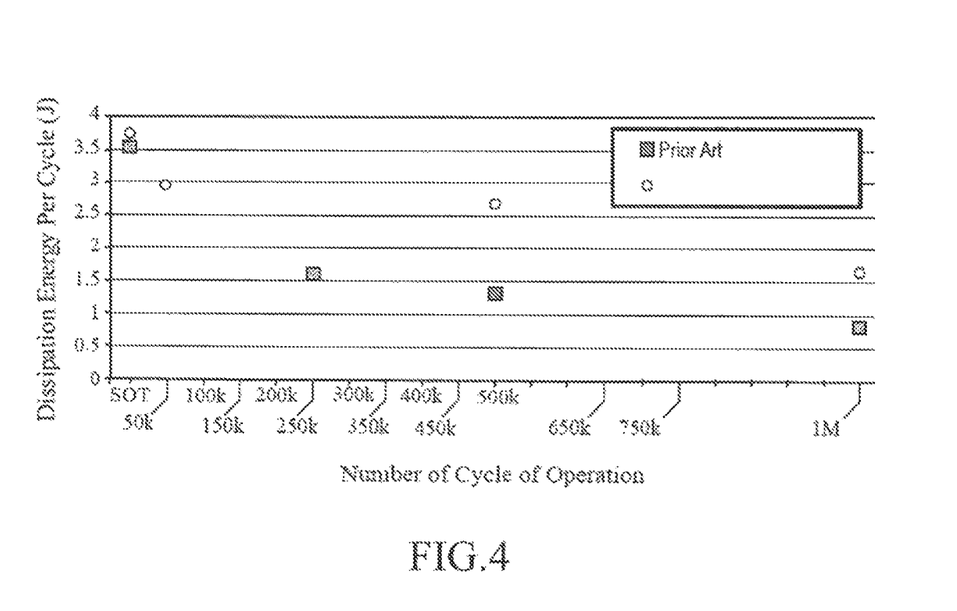
FIG. 4 is a plot comparing the dissipation energies per cycle of the vehicle mount using the magneto rheological fluid composition of the present invention and the Prior Art over 5,000,000 cycles of operation.

Dissipation energies per cycle of the vehicle mount using the magneto rheological fluid composition of the present invention and the Prior Art are also measured during the durability tests. Specifically, the dissipation energies per cycle for the vehicle mount are measured at the start of test, 50,000 cycles of operation, 250,000 cycles of operation, 500,000 cycles of operation and 1,000,000 cycles of operation. FIG. 4 shows a comparison of the dissipation energy per cycle of the vehicle mount using the magneto rheological fluid composition of the present invention and the Prior Art. As indicated by FIG. 4, near the end of the 1,000,000 cycles of operation, the dissipation energy per cycle for the vehicle mount is higher when the magneto rheological fluid composition of the present invention is used than the Prior Art.

In addition to measuring the dissipation energies per cycle over 1,000,000 cycles of operation, settling of the plurality of the magnetic responsive particles in the magneto rheological fluid composition of the present invention and the Prior Art is analyzed. Specifically, the settling of the magneto rheological fluids is analyzed after 100,000 cycles of operation, 200,000 cycles of operation, and 300,000 cycles of operation. To analyze the settling of the magneto rheological fluids, the magneto rheological fluids are disposed in a container and observed for clear layers separation over a period of 14 days. Results of the observation are shown below in Table 1.

TABLE 1

Settling Analysis Comparing the Magneto Rheological Fluid Composition of the Present Invention with the Prior Art

|  | % of Clear Layer Separation After 24 hr | % of Clear Layer Separation After 12 Days | % of Clear Layer Separation After 14 Days |
|---|---|---|---|
| Present Invention (After 200,000 Cycles) | <1.0% | N/A | <2.0% |
| Present Invention (After 1,000,000 Cycles) | <1.0% | N/A | <2.0% |
| Prior Art (After 100,000 Cycles) | 37.0% | 33.3% | N/A |
| Prior Art (After 200,000 Cycles) | 18.5% | 25.9% | N/A |
| Prior Art (After 300,000 Cycles) | 26.9% | 25.0% | N/A |
| Prior Art (After 1,000,000 Cycles) | 30.0% | N/A | N/A |

Figure 5:
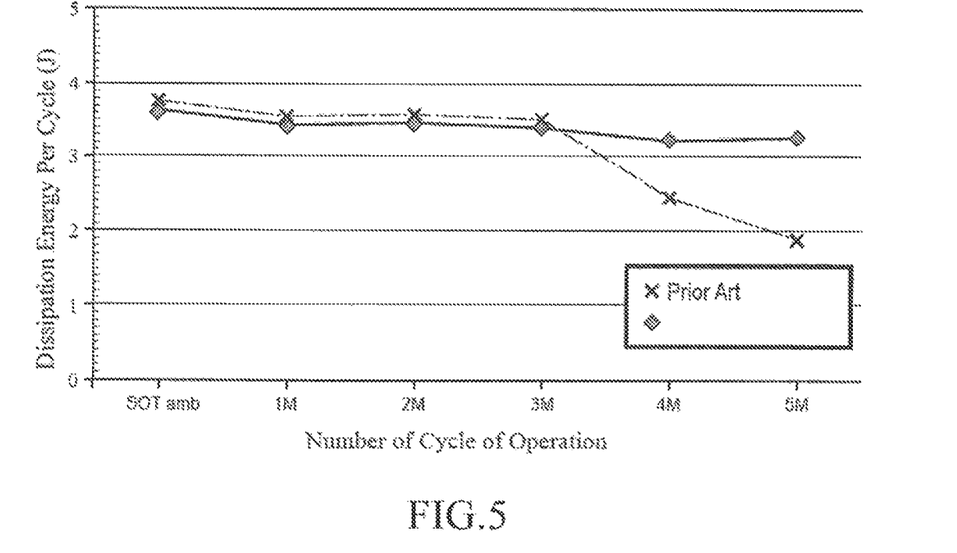
FIG. 5 is a plot a plot comparing the dissipation energies per cycle of the vehicle mount using the magneto rheological fluid composition of the present invention and the Prior Art over 1,000,000 cycles of operation.

Furthermore, the dissipation energies per cycle for the vehicle mount using magneto rheological fluid composition of the present invention and the Prior Art are measured over a period of 5,000,000 cycles of operation. Specifically, the dissipation energies per cycle for the vehicle mount are measured at the start of test, 1,000,000 cycles of operation, 2,000,000 cycles of operation, 3,000,000 cycles of operation, 4,000,000 cycles of operation and 5,000,000 cycles of operation. FIG. 5 shows a comparison of the dissipation energy per cycle of the vehicle mount using the magneto rheological fluid composition of the present invention and the Prior Art. As indicated by FIG. 5, between 4,000,000 cycles and 5,000,000 cycles of operation, the dissipation energy per cycle for the vehicle mount is higher when the magneto rheological fluid composition of the present invention is used than the Prior Art.

In addition to measuring the dissipation energies per cycle during the 5,000,000 cycles of operation, at the end of the 5,000,000 cycles of operation, the vehicle mount is disassembled and analyzed for fluid thickening and blockage. At the end of the 5,000,000 cycles of operation, the Prior Art thickened in the vehicle mount and exhibits a 45-50% blockage of the passage of the partition assembly. On the contrary, at the end of the 5,000,000 cycles of operation, the magneto rheological fluid composition of the present invention exhibits some fluid thickening in the vehicle mount and an only 10% blockage of the passage of the partition assembly.

Example 2

To further demonstrate the differences between the magneto rheological fluid composition of the present invention and the Prior Art, effects of the magneto rheological fluids on dynamic stiffness, damping control and damping work of the vehicle mount are measured. Similar to Example 1, the magneto rheological fluid composition used in the present example consists of silicone oil, a plurality of magneto responsive particles of iron and fumed silica. The Prior Art includes silicone oil, silica clay, a plurality of magneto responsive particles of iron, ethoxylated amine (e.g.

Ethomeen® T-15) and propylene glycol. In the present example, a plurality of vehicle mounts having the same structure as the vehicle mount set forth in Example 1 are used.

Figure 6:
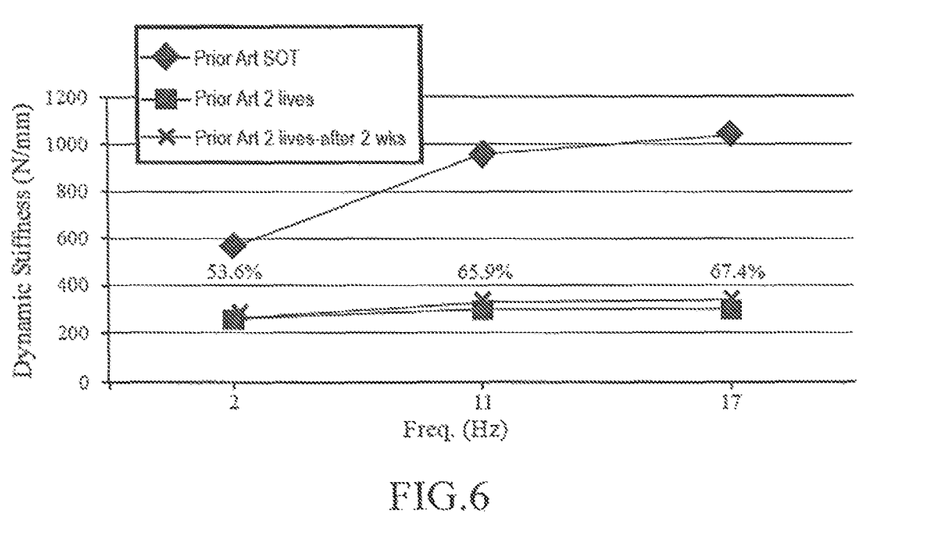
FIG. 6 is a plot showing the dynamic stiffness of the vehicle mount using the Prior Art.
Figure 7:
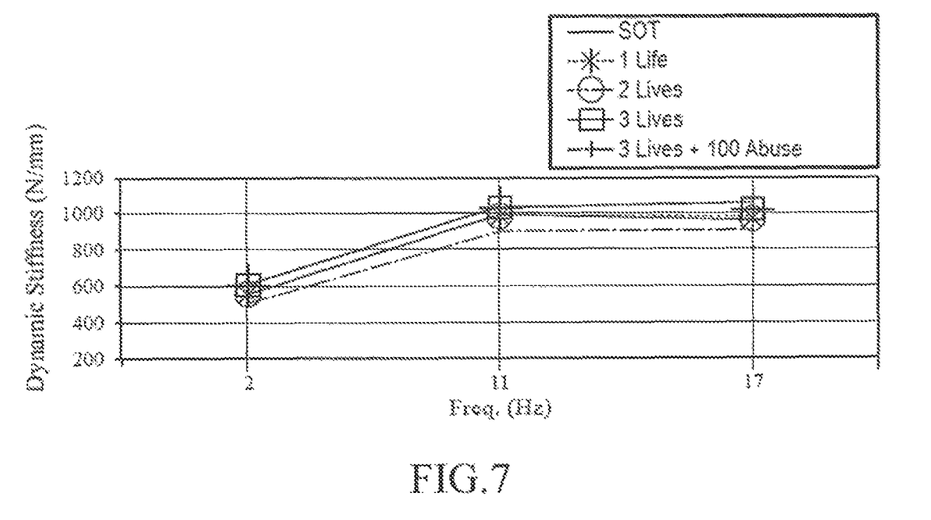
FIG. 7 is a plot showing the dynamic stiffness of the vehicle mount using the magneto rheological fluid composition of the present invention.
Figure 8:
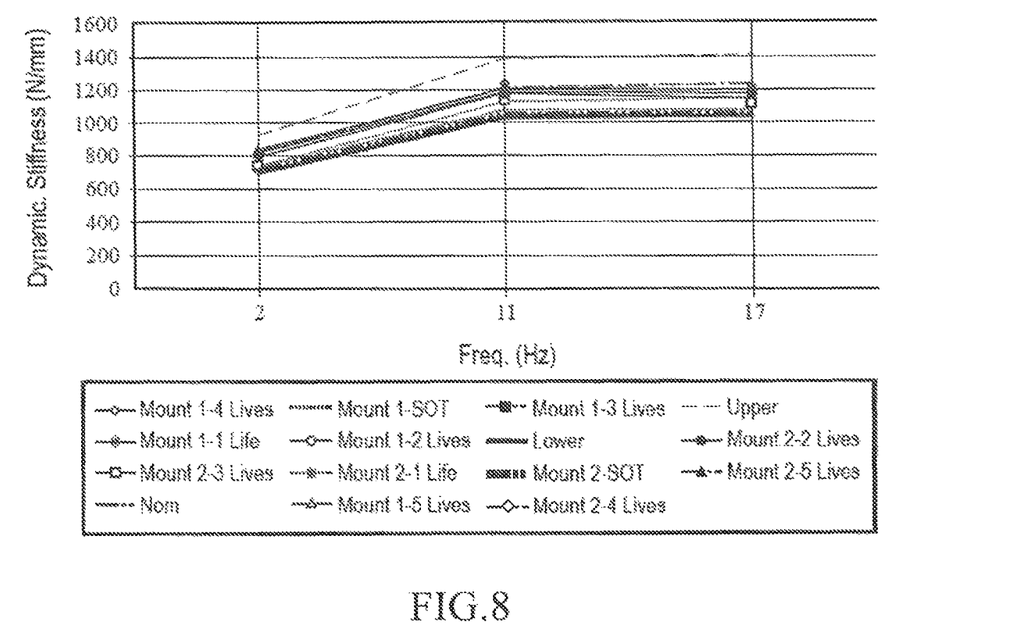
FIG. 8 is a plot showing the dynamic stiffness of the vehicle mount using the magneto rheological fluid composition of the present invention using two vehicle mounts.

To measure the damping stiffness of the vehicle mount, the vehicle mount is actuated at frequencies of 2 Hz, 11 Hz and 17 Hz and at a compression/rebound distance of ±1 mm. The damp stiffness is measured at the end of a fluid life. A fluid life is defined by a predetermined amount of cycles of operation performed by the vehicle mount, e.g. one fluid life=1,000,000 cycles of operation. FIG. 6 shows a measurement of the dynamic stiffness for a vehicle mount using the Prior Art over a period of two fluid lives. As shown in FIG. 6, there is a significant decrease in the dynamic stiffness of the vehicle mount between the first fluid life and the second fluid life. Specifically, over the period of two fluid lives and actuated at frequencies 2 Hz, 11 Hz and 17 Hz, the dynamic stiffness of the vehicle mount containing the Prior Art decreased by 53.6%, 65.9% and 67.4%, respectively. Such a decrease is caused by the settling of the magnetic response particles in the Prior Art. FIG. 7 shows a measurement of the dynamic stiffness for a vehicle mount using the magneto rheological fluid composition of the present invention over a period of three fluid lives. As shown in FIG. 7, there are no significant changes in the dynamic stiffness of the vehicle mount throughout the three fluid lives. FIG. 8 shows a measurement of the dynamic stiffness for two vehicle mounts using the magneto rheological fluid composition of the present invention over a period of five fluid lives. As shown in FIG. 8, even after five fluid lives there are no significant changes in the dynamic stiffness of the vehicle mounts.

Figure 9:
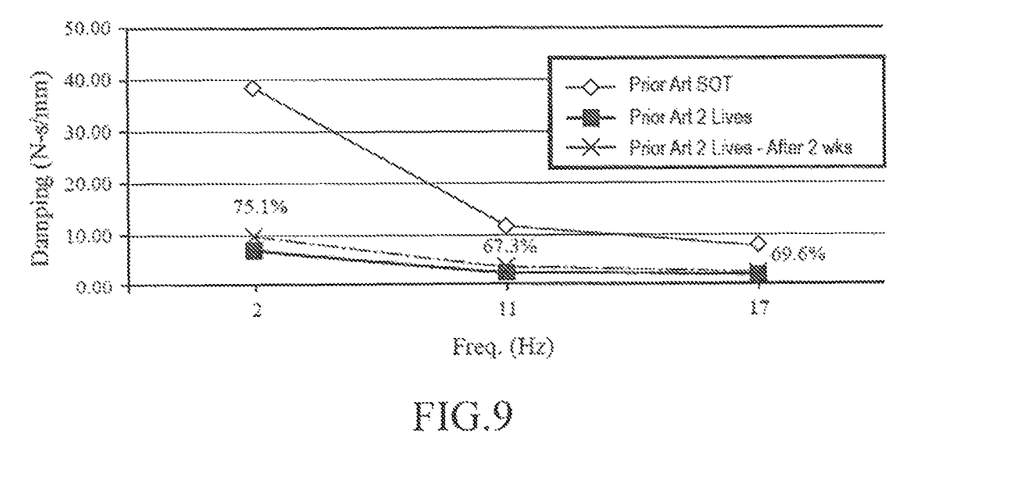
FIG. 9 is a plot showing the damping control of the vehicle mount using the Prior Art.
Figure 10:
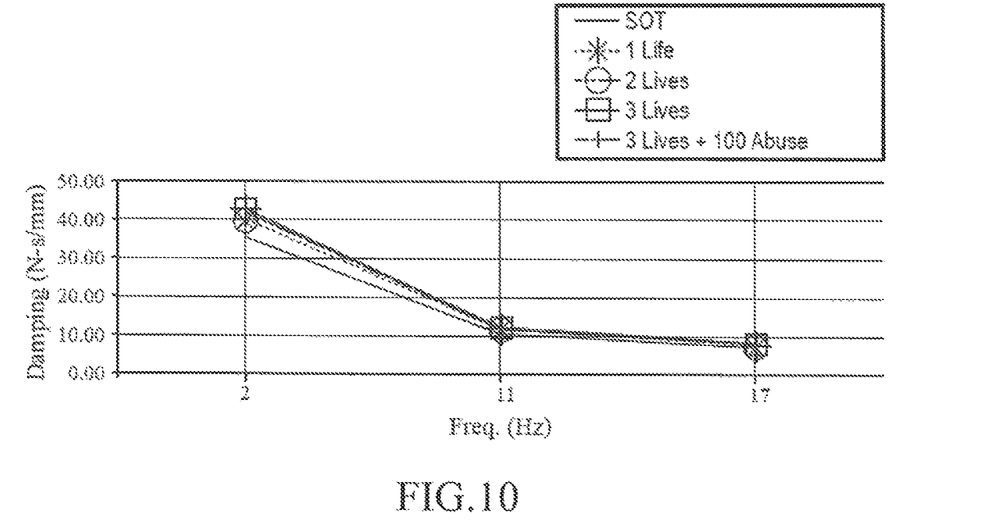
FIG. 10 is a plot showing the damping control of the vehicle mount using the magneto rheological fluid composition of the present invention.
Figure 11:
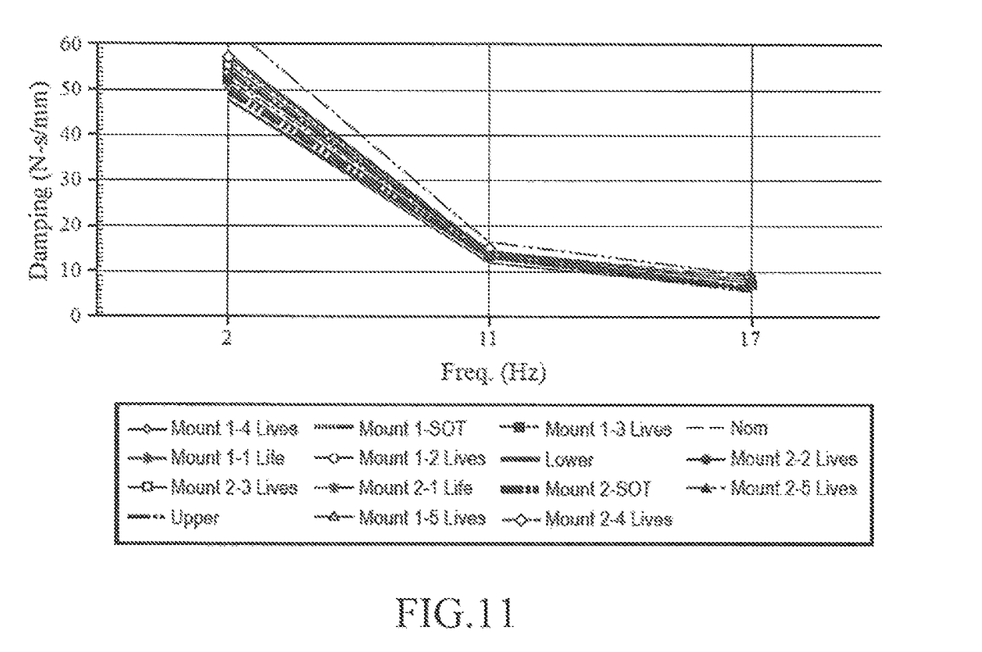
FIG. 11 is a plot showing the damping control of the vehicle mount using the magneto rheological fluid composition of the present invention using two vehicle mounts.

To measure the damping control of the vehicle mount, the vehicle mount is actuated at frequencies of 2 Hz, 11 Hz and 17 Hz and at a compression/rebound distance of ±1 mm. The damping control is measured at the end of a fluid life. FIG. 9 shows a measurement of the damping control for a vehicle mount using the Prior Art over a period of two fluid lives. As shown in FIG. 9, there is a significant decrease in the damping control of the vehicle mount between the first fluid life and the second fluid life. Specifically, over the period of two fluid lives and actuated at frequencies 2 Hz, 11 Hz and 17 Hz, the damping control of the vehicle mount containing the Prior Art decreased by 75.1%, 67.3% and 69.6%, respectively. Such a decrease is also caused by the settling of the magnetic response particles in the Prior Art. FIG. 10 shows a measurement of the damping control for a vehicle mount using the magneto rheological fluid composition of the present invention over a period of three fluid lives. As shown in FIG. 10, there are no significant changes in the damping control of the vehicle mount throughout the three fluid lives. FIG. 11 shows a measurement of the damping control for two vehicle mounts using the magneto rheological fluid composition of the present invention over a period of five fluid lives. As shown in FIG. 1, even after the five fluid lives, there are no significant changes in the dynamic stiffness of the vehicle mounts.

Figure 12:
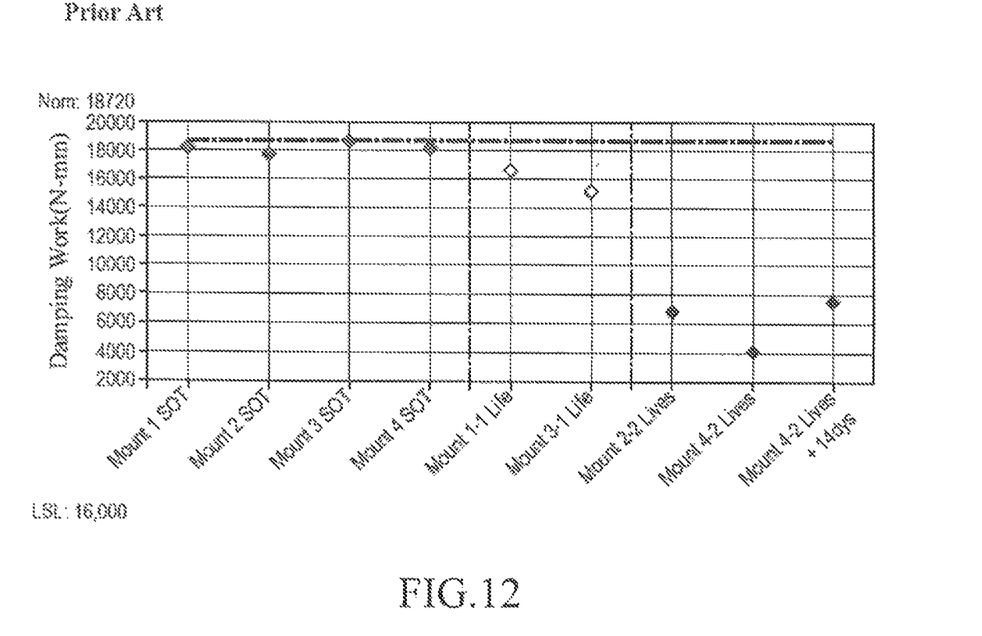
FIG. 12 is a plot showing the damping work of four vehicle mounts using the Prior Art.
Figure 13:
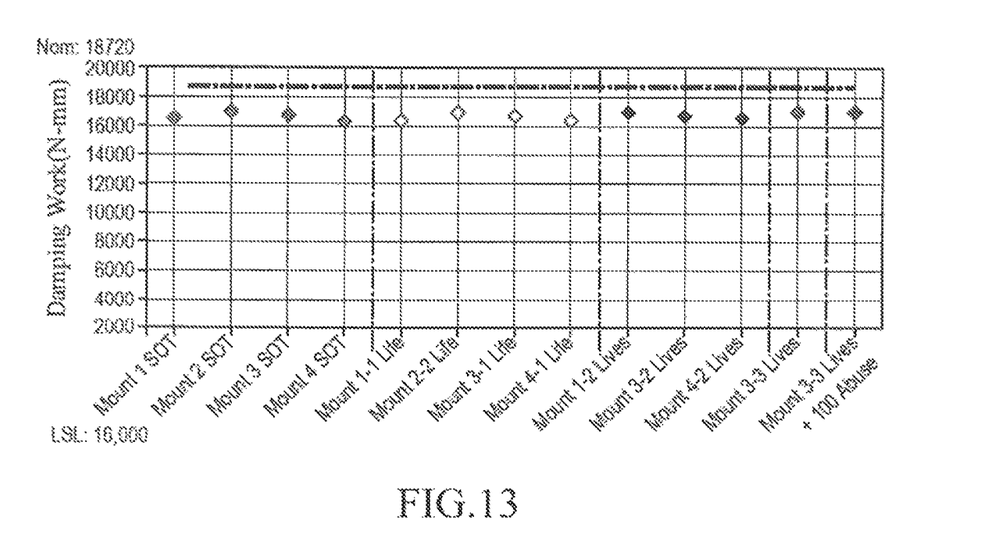
FIG. 13 is a plot showing damping work of four vehicle mounts using the magneto rheological fluid composition of the present invention.

To measure the damping work control of the vehicle mount, the vehicle mount is actuated at frequency of 11 Hz and at a compression/rebound distance of ±4 mm. The damp stiffness is measured at the end of a fluid life. FIG. 12 shows a measurement of the damping work control for four vehicle mounts using the Prior Art over a period of two fluid lives. As shown in FIG. 12, there is a significant decrease in the damping work control of vehicle mount between the first fluid life and the second fluid life. This phenomenon is also caused by the settling of the magnetic response particles. FIG. 13 shows a measurement of the damping work control for four vehicle mounts having the same structure using the magneto rheological fluid composition of the present invention over a period of two fluid lives. As shown in FIG. 13, there are no significant changes in the damping work control of the vehicle mount throughout the three fluid lives.

Obviously, many modifications and variations of the present invention are possible in light of the above teachings and may be practiced otherwise than as specifically described while within the scope of the appended claims. The use of the word "the" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A magneto rheological fluid composition for use in a vehicle mount having a flexible body and a diaphragm consisting of:
   a carrier fluid;
   a plurality of magnetic responsive particles dispersed in said carrier fluid;
   an anti-settling agent of fumed silica dispersed in said carrier fluid forming a thixotropic network with said carrier fluid suspending said magnetic responsive particles in said thixotropic network for preventing said magnetic responsive particles from settling;
   said composition being absent any additional additives providing stability to said thixotropic network and to said composition and preventing the flexible body and the diaphragm from reacting with said composition to prolong the life of said composition;
   wherein said plurality of magnetic responsive particles is iron, and said iron is present in an amount of 64 wt. % to 68 wt. %;
   wherein said fumed silica is present in an amount of 3 wt. % to 5 wt. %; and
   wherein said carrier fluid is silicone oil, and said silicone oil is present in an amount of 30 wt. % to 32 wt. %;
   wherein said composition has a density ranging between 2.2 g/ml and 2.5 g/ml;
   wherein said composition has a viscosity ranging between 200 cP and 400 cP at a temperature of 40° C.

2. The magneto rheological fluid composition as set forth in claim 1 wherein said plurality of magnetic responsive particles has an average particle size of between 0.1 µm and 1000 µm.

3. The magneto rheological fluid composition as set forth in claim 1 wherein said iron and present in an amount of 64 wt. % to 65 wt. %.

4. The magneto rheological fluid composition as set forth in claim 1 wherein said composition has a magnetic yield stress between 0.1-4 kPa in response to a magnetic field having a strength of 0.1 T.

5. The magneto rheological fluid composition as set forth in claim 4 wherein said composition has a magnetic yield stress between 18-24 kPa in response to a magnetic field having a strength of 0.5 T.

6. The magneto rheological fluid composition as set forth in claim 5 wherein said composition has a magnetic yield stress between 26-40 kPa in response to a magnetic field having a strength of 0.9 T.

7. A vehicle mount apparatus for supporting a vibration source comprising;

a housing extending about and along a first axis and defining a housing chamber, a flexible body made of elastic material at least partially disposed in said housing chamber supported by said housing and extending radially about and along said first axis for deforming elastically in response to a movement of the vibration source relative to the housing caused by an external excitation, a diaphragm made of an elastic material disposed in said housing chamber and spaced axially from said flexible body, a partition assembly disposed in said housing chamber extending between said flexible body and said diaphragm for dividing said housing chamber into an upper chamber extending between said flexible body and said partition assembly and a lower chamber extending between said partition assembly and said diaphragm with the volume of each of said chamber being changed by deformation of said flexible body and said diaphragm in response to the external excitation, said partition assembly defining a passage extending parallel to said first axis and disposed in fluid communication with said upper chamber and said lower chamber for allowing a fluid to flow between said upper chamber and said lower chamber in response to the external excitation, a magneto rheological fluid being responsive to a magnetic field disposed in the upper chamber and in said lower chamber, said magneto rheological fluid consisting of: a carrier fluid;

a plurality of magnetic responsive particles dispersed in said carrier fluid; an anti-settling agent of fumed silica dispersed in said carrier fluid forming a thixotropic network with said carrier fluid suspending said magnetic responsive particles in said thixotropic network for preventing said magnetic responsive particles from settling;

said composition being absent any additional additives providing stability to said thixotropic network and to said composition and preventing the flexible body and the diaphragm from reacting with said composition to prolong the life of said composition;

wherein said plurality of magnetic responsive particles is iron, and said iron is present in an amount of 64 wt. % to 68 wt. %;

wherein said fumed silica is present in an amount of 3 wt. % to 5 wt. %; and wherein said carrier fluid is silicone oil, and said silicone oil is present in an amount of 30 wt. % to 32 wt. %;

wherein said composition has a density ranging between 2.2 g/ml and 2.5 g/ml;

wherein said composition has a viscosity ranging between 200 cP and 400 cP at a temperature of 40° C.

* * * * *